United States Patent
Miller

[19]

[11] Patent Number: 6,152,306
[45] Date of Patent: Nov. 28, 2000

[54] SOLID WASTE REDUCTION

[75] Inventor: Alan E. Miller, Marietta, Ga.

[73] Assignee: Molecular Waste Technologies, Chamblee, Ga.

[21] Appl. No.: 08/961,245

[22] Filed: Oct. 30, 1997

[51] Int. Cl.[7] ............................. B03B 1/00; F23G 5/02
[52] U.S. Cl. .................... 209/3; 209/10; 209/11; 209/930; 110/220; 110/224; 110/342; 204/158.21
[58] Field of Search ..................... 110/218, 219, 110/220, 222, 224, 342; 209/3, 10, 11, 12.1, 930; 241/23, 24.1; 204/158.2, 158.21

[56] References Cited

U.S. PATENT DOCUMENTS

| | | | |
|---|---|---|---|
| 4,123,230 | 10/1978 | Kirkbride | 201/17 X |
| 4,234,402 | 11/1980 | Kirkbride | 208/209 |
| 4,326,470 | 4/1982 | Maranhao | 110/220 |
| 4,376,034 | 3/1983 | Wall | 202/124 X |
| 4,592,291 | 6/1986 | Sullivan, III | 110/346 |
| 5,100,638 | 3/1992 | Levin | 423/449 |
| 5,134,944 | 8/1992 | Keller et al. | 110/234 |
| 5,148,758 | 9/1992 | Saly et al. | 110/220 |
| 5,213,758 | 5/1993 | Kawashima et al. | 422/21 |
| 5,280,757 | 1/1994 | Carter et al. | 110/346 |
| 5,322,603 | 6/1994 | Kameda et al. | 204/158.2 |
| 5,397,551 | 3/1995 | Won Sam | 422/186 |
| 5,507,927 | 4/1996 | Emery | 204/158.2 X |
| 5,541,386 | 7/1996 | Alvi et al. | 110/236 X |
| 5,609,256 | 3/1997 | Mankosa | 209/930 X |

FOREIGN PATENT DOCUMENTS

WO 91/03281   3/1991   WIPO .

OTHER PUBLICATIONS

Press Release "BOC & EWMC Form Joint Marketing Agreement for New Environmental Technology," Murray Hill, N.J., Mar. 26, 1996.

*Primary Examiner*—Tuan N. Nguyen
*Attorney, Agent, or Firm*—James Creighton Wray; Meera P. Narasimhan

[57] ABSTRACT

Dumped solid waste is mixed with sand and fed through a shredder. Sorters sort aluminum glass and ferrous materials from the shredded waste, and an indirect fired dryer heats the remaining shredded waste. Dust in gases from the dryer is removed in a bag house. Sand is added to the dried, shredded waste, and the waste is cooled and stored in surge storage. The shredded, dried, cooled and stored waste is fed to one or more reducing chamber units. Waste is moved through individual chambers within the units with augers and is gravitationally fed between the chambers. Gases from the chambers are condensed, and the condensate is stored as oils. Solid products from the reducing chamber units are cooled. The sand is separated from the solid product. The resultant solid product and oils may be sold as fuel and feedstock, or the resultant product may be pulverized and combined with the oil in a slurry which is used as a fuel or a feedstock.

38 Claims, 2 Drawing Sheets

SOLID WASTE REDUCTION

BACKGROUND OF THE INVENTION

For the past century, the population has increased, has migrated across countries and has started to concentrate in metropolitan areas, resulting in larger concentrations of people.

People generate on average 3.5 pounds of waste per day, and average 1 passenger car tire per person per year. For years waste was simply buried in land fills and forgotten. As land becomes scarcer for such ventures, many cities are finding themselves paying to haul the waste great distances out of their cities to available land. In some cases it is now necessary to literally ship waste across countries to available space.

Laws now mandate reduction in waste volume, which slows the problem but does nothing to solve it long term. Some municipalities have instituted burning of waste in old land fills. This is now suspect, as the release of toxic dioxin is becoming evident.

Municipal waste along with the tires may have the following makeup; for example, moisture 20.2%, paper 29.1%, yard waste 7.5%, metals 7.4%, glass 6.6%, food 3.4%, plastic 5.7%, miscellaneous 3.8% and tires 16.3%.

The approximate breakdown of a typical ton of waste would have the following pounds of these materials: water 436, paper 628, yard waste 162, metals 156, glass 142, food 72, plastics 125, miscellaneous 82, tires 196.

Since each person generates approximately 3.5 pounds per day of garbage and one tire per year, the problem grows annually, far beyond any known technology. The practice of burning has slowed the moving about of the piles, but recent reports on the levels of dioxin may soon curtail this method of volume reduction.

There is an almost desperate need for the reduction in volume of municipal waste. Current federal and state laws mandate acceptable levels of waste disposal, but have no technology that has come close to helping meet the mandated levels. Landfills are still the predominate answer. Work continues on the volume issue, and attempts to build areas that are safe from odor, leakage, and vermin. However, as population centers grow, the pile over there becomes the pile over here.

While there have been attempts to get people to segregate the various items in the assortment of waste, sorting has had a spotty performance. Once in a land fill, various components react quite differently. Some decompose; others just lie in preservation. Newspapers buried 30 years ago were dug up and found to be completely readable. Tires have been banned from many sites due to volume and slow decomposition. Long standing needs exist for solutions to municipal waste and tire disposal.

SUMMARY OF THE INVENTION

The invention provides a solution to the complex problem. The new process eliminates volume and dump problems, in proximity to the source of the problem, which should reduce costs.

Municipal waste in bulk is reduced below the 25% reduction currently mandated by law. Municipal waste is processed in an oxygen free atmosphere so as not to produce oxides of various gaseous components when municipal waste burns, oxidizes or otherwise decomposes. The invention includes a semi-sealed continuous process chamber or chambers, inert gas injection and internal hot gas re-circulation. External thermal energy is applied under continuous temperature monitoring, and temperature control throughout the process. Microwave generation with variable power controls and a final cooling and separation avoid auto ignition of the product upon being exposed to the atmosphere. The product is separated into various components. Condensing units with temperature controls condense and collect gaseous emissions.

The present invention uses the waste only after it is collected. The invention is not in the collection side of the business. Delivered to the site, the invention reduces the entire waste to basic components. The bulk is reduced by 80%, and the remaining weight is concentrated in two basic forms, oil and carbon black, which can be easily handled, removed and used for energy purposes or as feedstock.

While molecular reduction can be carried out to various levels of reduction, it is intended to carry the reduction out to the maximum level. At this level, valuable byproducts are created: oil and carbon black. Both are clean forms of combustible energy, and both are excellent feedstock for chemical processes and manufacturing.

Each ton of this waste will produce 42 gallons of oil and 700 pounds of carbon black. Together, they return 18,160,000 Btu. and consume 2,583,200 Btu. in processing energy, which would result in a return of about 9:1.

This process is accomplished in an inert environment so as not to generate toxic fumes. The invention leaves a saleable residue that may be stored and will not leak out in a few years. Because the new system is environmentally clean, it can be placed in any area. The residual non-combustible products are inert products such as metals and glass, which can be separated and recycled.

The inclusion of the microwave power in spite of its intense consumption of energy is useful to speed up the drying and heating of the product, and transferring heat aids in the temperature control as well as contributing to the reduction process. Variable power magnetrons of 915 MHZ and 2450 MHZ will be used depending on the requirements at various stages of the process.

Other methods of heating and drying may be employed to accelerate the process and reduce costs.

Elevated temperatures in the range of 300° C. to 400° C. are employed. Many toxic gases come off as effluent and are condensed, captured or neutralized. The apparatus processes the municipal waste in a sealed, controlled and inert atmosphere. Toxic gases formed by oxidation are not formed and need not be dealt with because oxygen is not present.

This invention affordably and significantly reduces the volume of municipal waste. In addition, this invention recovers products reusable by industries such as steel, chemical, agriculture and power generating plants.

The invention provides heating and drying of previously sorted and shredded municipal waste. A compacting feeder is used to reduce the oxygen content and to feed waste to the system in a compressed form. Inert gas generators flood the feed compartment with an on-site produced inert gas which is rich in nitrogen, but void of oxygen. Since the inert gas is heavy, it displaces oxygen laden air during the feeding of the waste to the process. Additional inert gas is required to maintain and control a nonreactive atmosphere during later stages of the process.

For purposes of temperature control, atmosphere control, byproduct collection and byproduct quality, multiple stages of processing are employed. Pyrometers are employed throughout to monitor, control and record temperatures.

During the stages of microwave treatment, the product is agitated, mixed, ground and advanced through each stage by augers. Agitating and mixing break the products apart. Continuous mixing avoids hot spots and advances the product to various stages. While the product is in the chambers, significant amounts of microwaves and heat are applied to break the carbon bonds by heating and gasifying the product to a gaseous state and carbon.

After satisfactory treatment has been accomplished, cool, wet concrete sand is blended into the solids remaining to cool the product sufficiently to avoid auto ignition when exposed to the atmosphere.

After this cooling, the product is processed through a water bathed dehydrator screw incorporating surface skimmer to float off the carbon black which is extremely light and is easily separated from the water and the heavy sand. Oil skimmers are used to skim any residual oil.

Each plant site occupies about 4-5 acres. Equipment is installed on a basic concrete slab. Buildings house all raw waste, which is treated with the first process within hours of being received at the center. This treatment immediately makes the waste odor free and no longer appealing to insects and vermin. The entire operation presents nothing objectionable to local neighborhoods.

Throughout the process, the invention works by capturing and neutralizing all objectionable components at the time they are released from the waste. The plant is no more noticeable than a light manufacturing company.

While a municipality could concentrate several plants in one area, the ability to place the plants in various sites speeds up delivery and cuts down the hauling cost and time in transporting to far ranging sites.

Each plant employs 50 to 60 people and serves 150,000 to 175,000 people. Capitalization costs run about $106 per person served. The costs are due to operating funds. Each plant takes 8 to 12 months to be in operation.

Operations of the plants meet all current EPA standards. The plants are OSHA compliant in all regards. All of the equipment that is used for the invention is currently being used in other applications and meets those requirements.

Dumped solid waste is mixed with sand and fed through a shredder. Sorters sort aluminum glass and ferrous materials from the shredded waste and an indirect fired dryer heats the remaining shredded waste. Dust is removed from gases exiting the dryer through a bag house. Sand is added to the dried, shredded waste. The waste is cooled and stored in surge storage. The shredded, dried, cooled and stored waste is fed to one or more reducing chamber units. Waste is moved through individual chambers within the units with augers and is gravitationally fed between the chambers. Gases from the chambers are condensed, and the condensate is stored as oils. Solid products from the microwave units are cooled. The sand is separated from the solid product. The resultant solid product and oils may be sold as fuel and feedstock, or the resultant product may be pulverized and combined with the oil in a slurry which is used as a fuel or a feedstock.

The waste processing apparatus includes a waste dump, a waste feeder connected to the waste dump and a shredder connected to a waste feeder. Sorters are connected to the shredder. An indirect fired dryer follows the shredder. A cooler is connected to the dryer, and a surge storage is connected to the cooler. Reducing chamber units are connected to the surge storage. The reducing chamber units have plural successively smaller stages. Gas collectors are connected to the chambers and condensers are connected to the gas collectors for condensing the gases. The condensates are stored as oils. A cooler is connected to the reducing chamber units, and a separator is connected to the cooler. A sand supply connected between the dryer and the cooler mixes sand with the material from the dryer as it enters the cooler. A separator classifier separates sand and heavies from the solid output before the second cooler.

Preferably, the sorters include aluminum, glass and ferrous material sorters. In preferred embodiments, plural reducing chamber units are selectively connected to the feeder.

The gas collectors and condensers have a separate gas collector and condenser connected to each chamber. Preferably, the chambers are successively smaller, and the chambers have plural augers within each chamber for moving the material through the chamber. Each successive chamber is positioned below a prior chamber for gravitational flow of the material between the chambers.

The preferred method of treating the waste includes dumping waste, feeding the dumped waste, shredding the waste, sorting the waste, drying the shredded waste, removing gas from the drying waste then either cooling the dried waste for stockpiling and conveying dried waste to reducing chamber units. Moving the waste through the reducing chamber units while exposing the waste to microwaves generates gases. Collecting gases from the microwave treated waste and condensing the collected gases produce valuable oils. Solid material is cooled and collected from the chamber.

The method further includes supplying sand to the shredded waste material between the dryer and the dried material cooler, and separating the sand and heavies from product material after the reducing chamber units and recycling the sand. The new method further includes introducing sand to the waste feed. The sand is introduced to the waste feed before the shredder. The sorting includes sorting aluminum, glass and ferrous material from the shredded waste.

The drying of the shredded material occurs in an indirect fired dryer, and flowing gases from the dryer through a bag house dust separator removes dust. Only the gases generated by the waste need be filtered and treated.

Preferably, the method includes storing the dried and cooled shredded waste in a surge storage and conveying the shredded waste from the surge storage to the reducing chamber unit. The surge stored, shredded, dried and cooled waste is directed to one of plural reducing chamber units. Moving the waste through the reducing chamber units includes moving the waste through successive reducing chambers. Stirring and moving the waste in the reducing chambers uses plural augers in each chamber. Gravity feeding moves the shredded waste to successive chambers. Pulverizing the solid product material and blending the pulverized solid material with the condensate produces a fuel or feedstock that results in a uniform product.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
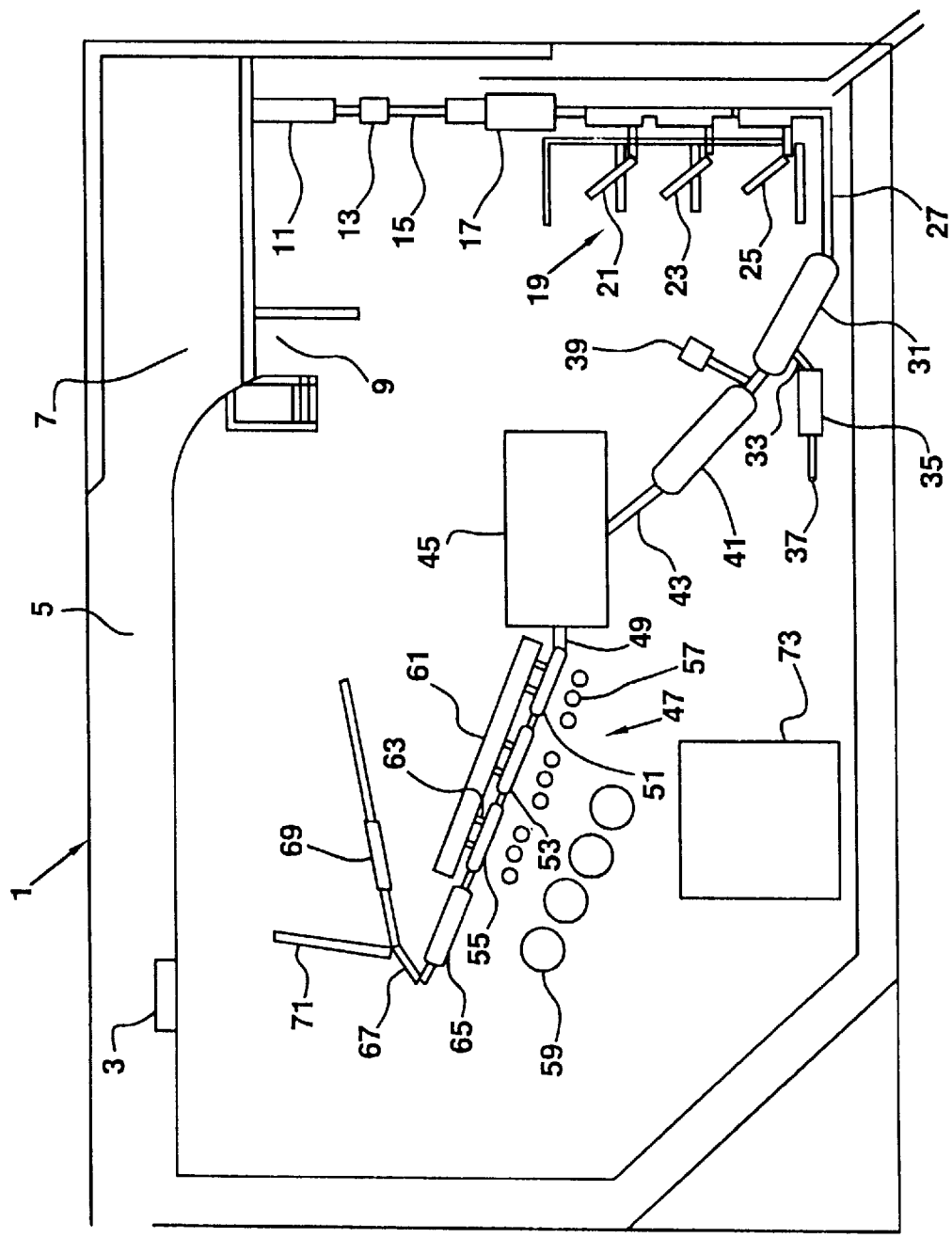
FIG. 1 is a schematic representation of a waste treatment plant.

Referring to FIG. 1, a waste treatment plant is generally indicated by the numeral 1. Trucks are weighed on truck scale 3 and enter the plant on roadway 5 where they tip waste into the dump area 7. Sand for mixing with the waste is stored in a sandpit 9. Waste is moved from the dump area 7 by a pusher, either an installed pusher or a mobile pusher, and enters a waste feeder 11. Sand is added to the waste stream by a sander 13. The waste stream 15 enters a shredder 17 which shreds the waste and mixes the waste intimately with sand. The shredded waste then enters sorters 19 which remove aluminum 21, glass 23 and ferrous materials 25. The shredder 17 may follow the sorters. The waste stream 27 which leaves the sorters is depleted of recyclable sortable solid materials. The waste stream enters an indirect fired dryer 31 which is heated between about 300° F. and 400° F. Gases 33 leaving the dryer have dust removed in a bag house filter 35. Exiting gases 37 contain mostly water vapor, however condensers or gaseous treatment may be employed to meet EPA standards. Sand is added by a sander 39 to the shredded and dried materials leaving the dryer 31. A cooler 41 cools the shredded and dried materials in the presence of the mixed sand. Both the dryer 31 and cooler 41 are sealed so that no additional air reaches the heated materials. Finally, the shredded, dried and cooled materials are conveyed by a conveyor 43 to a surge storage 45. The surge storage provides waste to one of several reducing chamber units 47 which have a pre-treatment chamber 49 and individual treatment chambers 51, 53 and 55. Gases from the individual reducing chambers are condensed by condensers 57 and are stored in individual storage tanks 59. Microwave generators in building 61 are connected by waveguides 63 to the reducing chambers.

The solid products leaving the reducing chamber units 47 are conveyed to a cooler 65 which cools the sand and solid products. The cooled materials are delivered to a separator 67 which separates the sand 69 for recycling to the initial waste stream and the dried shredded waste stream. The solid product 71 is collected for sale as a fuel or feedstock. The liquid products from storage tank 59 are sold as fuel and feedstock. The solid product in one embodiment is pulverized and blended with liquid from the storage tanks 59 and is sold as a slurry for fuel or feedstock. When sold as a fuel, the solid product, liquid products and slurry may be consumed on site in co-generators with the resulting electrical power sold or used in the waste treatment process. A laboratory 73 samples the liquid products in storage tanks 59 for content and quality.

Figure 2:
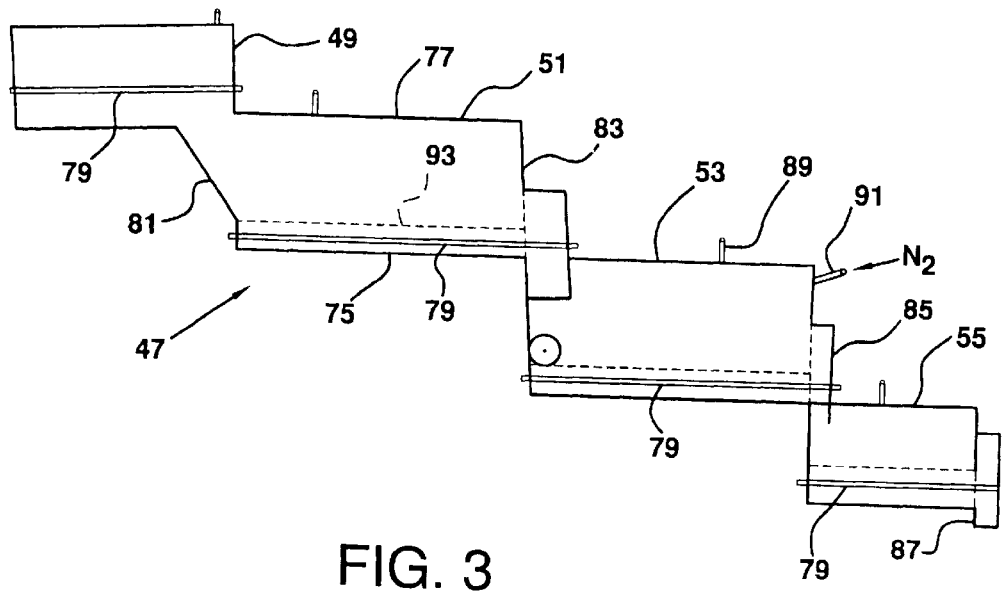
FIG. 2 is schematic elevation of a reducing chamber unit having multiple units.

As shown in FIG. 2, each reducing chamber unit 47 has a receiver chamber 49 and multiple reducing chambers 51, 53 and 55 which diminish in size. Each reducing chamber may be disconnected from the adjacent chambers and removed and replaced. Each chamber has a base 75 and a top 77 with microwave windows which connect to waveguides from nearby microwave generators. Parallel shafts 79 are mounted on generally horizontal axes. Augers are mounted on the shafts and the shafts rotate and counter rotate to move the shredded, dried waste materials. Each chamber 51, 53 and 55 is successively smaller than the preceding chamber to account for the reduction in solids in the previous chamber. In the initial chamber 49, the material is subjected to high-energy low-frequency microwaves at about 915 MHZ.

Gas is collected from the initial storage 59 and is condensed in a separate condenser and stored in a separate storage tank. The augers on shafts 79 within chamber 49 circulate the material, depth shown by line 93, within the chamber and move the material to the chute 81 which gravitationally feeds the material to the first chamber 51 of successively smaller chambers. The method of mixing, shredding and transporting to smaller chambers greatly enhances the uniformity of the end-product, which is very desirable when used as a fuel. Dried, shredded waste material mixed with sand is moved within the chamber 51 and along the bottom 75 with augers on the 10 foot shaft 79. The material falls through a chute 83 to a subsequent chamber 53 in which the material is exposed to microwaves at a frequency of about 2450 MHZ. Augers on shaft 79 stir the remaining shredded material and sand and move the material around the chamber 53 and out of the chamber 53 and through chute 85. The final chamber 55 is reduced in size to account for the desiccation of the materials in the previous chambers. In the last chamber 55, the material mixed with sand is moved through the chamber with augers on shaft 79 and is moved out of the chamber through gravitational chute 87 which delivers the products first to a cooler and then to a separator. The material and sand in the chambers is heated by the microwaves and externally applied heat to about 350° C. to 450° C. which is sufficient to gasify the materials. The chambers are flooded with nitrogen gas which is separated at the condensers and recycled to the chambers through supply pipe 91. The gases collected from each one of the chambers, through discharge pipe 89, are separately condensed and the condensates are separately stored and analyzed. More valuable condensates are sold as oils for feedstock. Less valuable condensates may be sold as fuel or may be augmented with pulverized product material and sold as fuel or augmented feedstock. In one example, the incoming or pre-treatment chamber 49 has a floor about 4 and a half feet long and may have a height of about 8 feet. Chamber 51 is about 8 feet by 8 feet in cross-section and has a length of about 8 feet. Chamber 53 is about 6 feet by 6 feet in cross-section and has a length of about 8 feet. Chamber 55 is about 4 feet by 4 feet in cross-section and has a length of about 5 and a half feet. The auger shafts 79 range in length from about 6 feet in chamber 49 to about 10 feet in chamber 51 and about 9 feet in chamber 53 to about 6 feet in chamber 55. The shafts are turned by external gears and motors.

Figure 3:
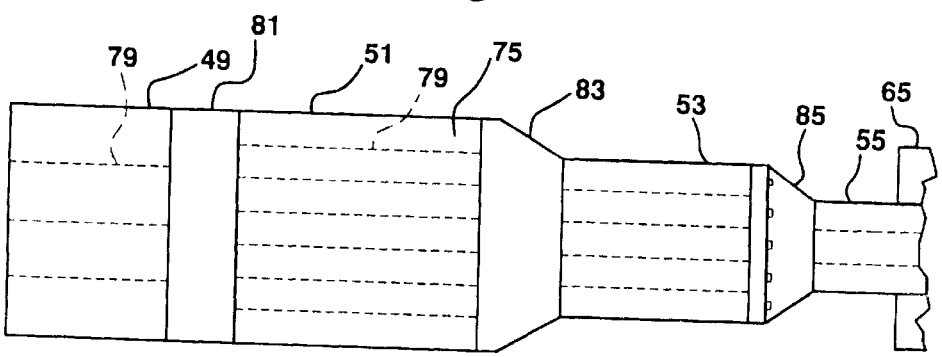
FIG. 3 is a bottom view of the reducing chamber unit shown in FIG. 2.

FIG. 3 is a bottom view of the reduction chamber shown in FIG. 2. Each chamber has several auger shafts 79 for agitating, mixing, grinding and advancing the product through each chamber. The product is introduced to the reducing chamber unit in a receiver chamber 49. The augers advance the product through the receiver chamber to chute 81 where the product is gravitationally fed to the bottom 75 of the first chamber 51. Augers advance the product through the first chamber 51 to chute 83 where the product is gravitationally fed to the next chamber 53. The product is advanced through the chamber to chute 85 where it is gravitationally fed to the last chamber 55. Augers move the product to the chute at the end of the chamber where the product is gravitationally fed to a cooler 65. The cooler 65 cools the product before moving delivering it to a separator.

Figure 4:
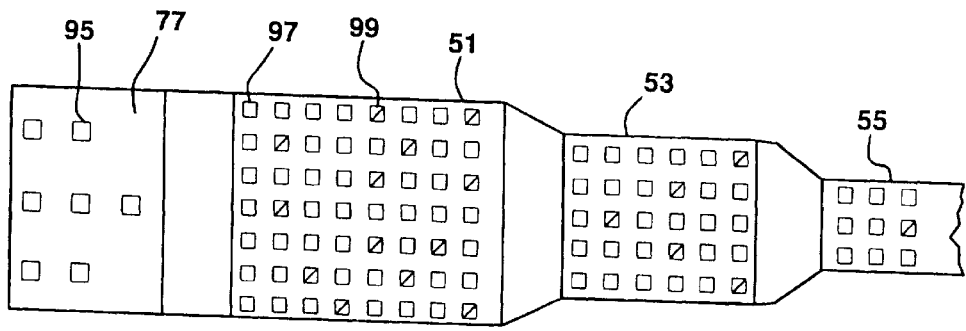
FIG. 4 is top view of the reducing chamber unit shown in FIGS. 2 and 3 showing connections for waveguides which convey the microwave energy to the chambers.

FIG. 4 is top view of the reducing chamber unit showing connections 95 for waveguides. Waveguides convey the microwave energy to the chambers. The product in chambers 51, 53 and 55 is exposed to microwaves at a frequency of about 2450 MHZ. As shown in FIG. 4, the product is continuously treated with microwave energy and externally applied heat as it is advanced through the chambers. To aid in preventing hot gas intrusion into the waveguides, a quartz glass lens is used to stop the intrusion. A blast of inert gas is directed over the face of the lens to avoid condensation damage to the lens. That also prevents gaseous emissions from entering the wave guide and condensing on the lens. Pyrometers are employed in the chambers to monitor, control and record temperatures. That data is used to determine how much microwave energy is required throughout the process. The generators can be controlled on/off 97 to supply needed energy.

In one preferred embodiment, aluminum, glass and ferrous materials are sorted from the tipped waste. A shredder receives the remainder and delivers shredded waste to a compacting feeder that squeezes air out of the mass. The output of the compactor is sealed and fed to the heater/dryer. From the dryer, the shredded, dried waste may be delivered (still sealed) to a finish chamber of a reducing chamber unit. The high power 914 MHZ units heat the waste to gasification temperatures, about 350° C. to 400° C., while the waste is agitated in an inert atmosphere. More easily volatile materials are gasified in the first chamber. Gases are collected, condensed and separated from the inert gas, and condensate liquid from the first chamber is collected and stored separately.

The remaining hot, shredded materials begin to break down under the influence of the 2450 MHZ microwaves and an externally applied heat in the second chamber. Resultant gases are collected, cooled, condensed and separated from the inert gas, which is recycled into the chambers, then condensed and stored separately. Flow through of the materials is controlled by controlling the speed and direction of the agitator. Some may turn in a direction which tends to set up reverse currents of materials in the chamber.

Steps continue in the separate chambers until all the chambers are traversed and the gasification is completed.

The chambers become smaller as the materials shrink in size. The gases are separately stored, tested and analyzed and sold, blended or used as a fuel on-site. The solid products are tested, analyzed, sold, pulverized and blown into an on-site co-generator furnace as a fluid fuel. Alternatively, the solid pulverized product is blended with one or more of the recovered liquids as a slurry for fueling a generator.

One plant, as an example, has the following characteristics:

Tipping: the capacity of system accommodates 600 tons per day.
1. Receiving: 600 tons per day
2. Sorting: 600 tons per day
3. Crushing: 600 tons per day Drying:
1. Direct feed to processor: 11 tons per hour
2. Storage to stockpile: 27 tons per hour
   a. Building: 800 ton capacity Processing:
1. Consecutive microwave units
   a. Four
   b. Bypass capability
   c. Areas on units for magnetrons or waveguides
   d. Inert atmosphere in all units I.G.G. N-2
2. Condensers and collection tanks
   a. Oil: 2700 bbl per week
   b. Sulphur
   c. Unknown Cooling unit:
1. Separate unit at end of processors
2. Cool from 350° to 90° C.–100° C.
3. Sand supply auger feed
4. Inert atmosphere
5. Skimmer for oil
6. Carbon black connection: 950 tons per week
   a. Stacker
   b. Special holding silo
7. Stacker for heavies
   a. Magnetic sorter Use of 915 MHZ magnetrons accelerates heating.

The addition of nitrogen at each phase avoids auto ignition.

Churning of the mixture through the chambers aids in heating and breakdown, while keeping temperature and processing even.

Pyrometers to read temperatures and control the process are connected to computers which control and monitor.

Quartz or similar lenses cover the waveguides where they pass energy into the processing cavities, keeping the waveguides free from blow back and contamination that would cause them to burn out.

Inert gas added internally blows across faces of lens covers to continuously clean them to keep them functioning.

Addition of sand at various stages cools the mass and avoids auto ignition.

While the invention has been described with reference to specific embodiments, modifications and variations of the invention may be constructed without departing from the scope of the invention, which is defined in the following claims.

I claim:

1. Waste processing apparatus comprising a waste feeder for receiving waste, an inert reducing chamber connected to the waste feeder, a microwave unit proximal the reducing chamber for supplying microwaves and reducing waste in the reducing chamber, gas collectors connected to the inert reducing chamber for receiving gases, coolers connected to the gas collectors for cooling the gases, and receivers for receiving reduced waste, further comprising an inert gas source connected to the reducing chamber for supplying inert gas.

2. The apparatus of claim 1, further comprising a shredder connected to the waste feeder for shredding waste and supplying shredded waste to the reducing chamber.

3. The apparatus of claim 1, further comprising sorters connected to the waste feeder for sorting waste.

4. The apparatus of claim 3, further comprising an indirect fired dryer connected to the shredder.

5. The apparatus of claim 1, wherein the coolers comprise first and second coolers.

6. The apparatus of claim 5, further comprising a surge storage connected to the first cooler and the reducing chamber.

7. The apparatus of claim 5, wherein the second cooler is connected to the microwave unit.

8. The apparatus of claim 1, wherein the reducing chamber comprises plural successively reduced volume stages for receiving waste successively reduced by the microwaves.

9. The apparatus of claim 5, further comprising a separator connected to the second cooler.

10. The apparatus of claim 1, further comprising a sand source connected to the reducing chamber for supplying sand for mixing with waste.

11. The apparatus of claim 10, further comprising a separator for separating sand and waste.

12. The apparatus of claim 1, further comprising augers in the reducing chamber for moving waste in the chamber.

13. The apparatus of claim 1, further comprising plural reducing chambers and plural microwave units for reducing waste in the plural reducing chambers.

14. The apparatus of claim 13, wherein the plural reducing chambers are successively less volume chambers and wherein the plural chambers are positioned for gravitational flow of waste into successive chambers.

15. Waste processing apparatus comprising a waste dump, a waste feeder connected to the waste dump, a shredder connected to the waste feeder, sorters connected to the waste feeder, an indirect fired dryer connected to the shredder, a first cooler connected to the dryer, a surge storage connected to the first cooler, an inert reducing chamber unit connected to the surge storage, at least one microwave unit for reducing waste in the reducing chamber unit by microwaves, gas collectors connected to the reducing chamber unit and condensers connected to the gas collector for condensing the gases, a second cooler connected to the microwave unit and a separator connected to the second cooler, further comprising an inert gas source connected to the reducing chamber unit.

16. The apparatus of claim 15, further comprising a sand supply connected between the dryer and the first cooler for mixing sand with the material from the dryer as it enters the first cooler and wherein the separator separates sand from an output of the second cooler.

17. The apparatus of claim 15, wherein the sorters comprise aluminum, glass and ferrous material sorters.

18. The apparatus of claim 15, further comprising plural reducing chamber units selectively connected to the surge storage, and at least one of the reducing chamber unit having plural successively smaller stages.

19. The apparatus of claim 15, wherein the gas collectors comprise a gas collector connected to each reducing chamber.

20. The apparatus of claim 15, wherein the reducing chambers are successively smaller.

21. The apparatus of claim 15, wherein the reducing chambers comprise augers within each chamber for moving the material through the chamber.

22. The apparatus of claim 21, wherein each successive chamber is positioned below a prior chamber for gravitational flow of the material between the chambers.

23. A method of treating waste comprising dumping waste, feeding the dumped waste, shredding the waste, sorting the waste, drying the shredded waste, removing gas from the drying waste, conveying the dried waste to inert reducing chamber units, supplying inert gas to the reducing chamber units, supplying microwaves to the reducing chamber units by microwave units, moving the waste through the reducing chamber units while exposing the waste to microwaves, collecting gas from the reducing chamber units, condensing the collected gas and cooling and collecting the solid material from the reducing chamber units.

24. The method of claim 23, further comprising supplying sand to the shredded waste material after the drying and separating the sand from product material from the reducing chamber units and recycling the sand.

25. The method of claim 23, further comprising introducing sand to the waste feed.

26. The method of claim 25, wherein the sand is introduced to the waste feed before the shredder.

27. The method of claim 24, wherein the sorting comprises sorting aluminum, glass and ferrous material from the shredded waste.

28. The method of claim 24, wherein the drying the shredded material comprises supplying heat from an indirect fired dryer, and flowing gases from the dryer through a bag house dust separator.

29. The method of claim 28, further comprising subjecting the dried material to gaseous treatment.

30. The method of claim 24, further comprising storing the shredded, dried and cooled waste in a surge storage and conveying the shredded waste from the surge storage to the microwave units.

31. The method of claim 30, further comprising conveying the surge-stored, dried and cooled shredded waste selectively to one of plural microwave units.

32. The method of claim 24, wherein the moving of the waste through the reducing chamber units comprises moving the waste through successive chambers.

33. The method of claim 32, further comprising stirring and moving the waste in the chambers with augers in each chamber.

34. The method of claim 33, further comprising gravity feeding the shredded waste to successive microwave chambers.

35. The method of claim 32, wherein gas from individual chambers is separately condensed and collected as oils.

36. The method of claim 23, wherein the condensed gas is collected as oil.

37. The method of claim 23, further comprising pulverizing the solid product material and blending the pulverized solid material with the condensate as a fuel or feedstock.

38. Waste processing apparatus comprising a waste dump, a waste feeder connected to the waste dump, a shredder connected to the waste feeder, an indirect fired dryer connected to the shredder, a first cooler connected to the dryer, a surge storage connected to the first cooler, an inert reducing chamber unit connected to the surge storage, an inert gas supply connected to the reducing chamber unit, the reducing chamber unit having plural successively smaller stages, at least one microwave unit for supplying microwaves to the reducing chamber, gas collectors connected to the reducing chamber unit and condensers connected to the gas collector for condensing the gases, a second cooler connected to the reducing unit and a separator connected to the second cooler.

* * * * *